Nov. 13, 1923.

J. R. MILLWARD

METALLURGICAL FURNACE

Filed Nov. 5, 1920

1,474,157

Inventor

Patented Nov. 13, 1923.

1,474,157

UNITED STATES PATENT OFFICE.

JOHN ROSCOE MILLWARD, OF NEWARK, NEW JERSEY.

METALLURGICAL FURNACE.

Application filed November 5, 1920. Serial No. 421,814.

*To all whom it may concern:*

Be it known that I, JOHN ROSCOE MILLWARD, a citizen of the United States, residing at Newark, in the county of Essex and State of New Jersey, have invented new and useful Improvements in Metallurgical Furnaces, of which the following is a specification.

This invention relates to metallurgical furnaces and consists of improved features of construction and arrangement resulting in an improved mode of operation and more efficient combustion of the fuel gases. My present improvements are particularly applicable to the open hearth type of furnace constructions employed in the processes of steel manufacture and an important object thereof is to eliminate certain objectional features and conditions obtaining in furnace constructions as at present in general use.

In standard open hearth furnace practise the fuel gases are introduced at the ends of the combustion chamber through the lower ports immediately above the metal bath and an air supply to support the combustion is admitted through upper ports and the resulting combustion of the fuel occurs actively within the full interior of the combustion chamber with the result that the gases in the final stages of combustion and when at their highest heat tend to rise and thereby occupy the uppermost region of the chamber. As a result thereof the more active or intense combustion is removed from the metal bath with corresponding loss in heating efficiency where desired.

In accordance with my present invention I have overcome the objections aforesaid by an improved construction of furnace designed to introduce a current or volume of spent or inert gas in a heated state above the air port and immediately under the furnace top to occupy the uppermost region of the furnace chamber so as to confine the active combustion of the fuel gas to a lower level and in closer proximity to the metal bath or hearth and further to promote the combustion and protect the furnace top to a large degree by reason of the iron oxides being intercepted and propelled longitudinally of the furnace by the waste gas volume.

In the preferred form of my improved furnace provision is made for the return or introduction into the upper level of the furnace of heated products of combustion by a return flue or flues from one end of the furnace to the other thus to provide for the substantially direct return of the spent gas in a cycle and with minimum loss of heat. As a result a circulation of displacing and protective spent gas or products of combustion is provided in the upper part of the combustion chamber entering in a highly heated condition above the air supply, first giving off heat thereto better to promote combustion of the fuel gas entering the bottom of the chamber; by its displacement confining the initial stages of the active combustion to a lower level and reabsorbing heat and to a large degree protecting the furnace top from the active combustion as it passes thereunder to and from the opposite end of the chamber.

My improved arrangement is particularly applicable to the standard type of reversing draft open hearth system in that the circulation of the protective volume or displacing spent gas is preferably effected by the draft through the furnace chamber. Further important features thereof comprise the provision of valve means to regulate the volume of gases returned, the specific arrangement of the return flues and desirable arrangement of the ports for introducing the returned products into the upper level of the combustion chamber.

The described and other features and advantages of my invention will be more fully understood by reference to the accompanying drawing wherein a desirable embodiment of my improvements is illustrated and wherein like reference chambers indicate the corresponding parts in the view.

In the drawings:—

Figure 1:
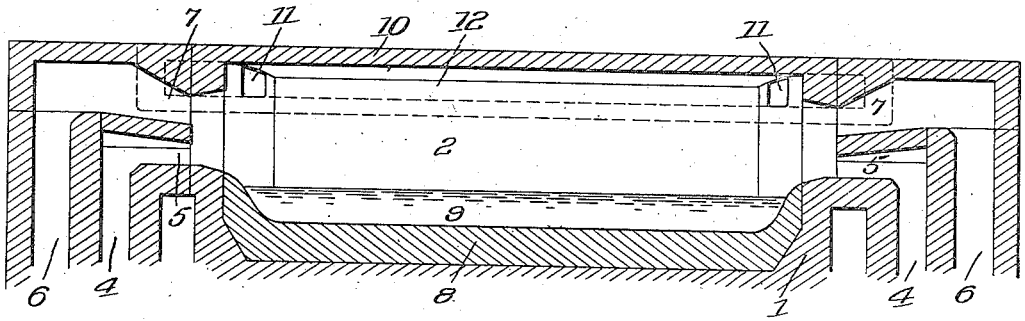
Fig. 1 is a vertical sectional view taken centrally and longitudinally through an open hearth furnace embodying the features of my invention.

In the approved embodiment of the features of my present invention as illustrated in the drawings, I have shown same incorporated in a reversing or regenerative type of open hearth furnace, wherein the fuel gas is admitted within the combustion chamber through the lower port at one end thereof, and wherein the volume of air to support the combustion is introduced through a port positioned above the fuel gas inlet port in the well known arrangement. This arrangement is advantageous in that the air volume is of higher specific gravity than the fuel gas, whereby the latter tends to rise and effects a thorough commingling of the elements and thereby promote more complete combustion, the products thereafter passing downwardly through the air and gas ports at the opposite end of the furnace, so as to reheat the regenerators in the customary manner.

The construction for operating in the manner in so far as described, conforms to the standard furnace arrangement as illustrated, wherein is indicated as a whole an open hearth furnace, enclosing the combustion chamber 2 into which the fuel gases are admitted from one end or the other from gas uptakes 4 through downwardly inclined ports 5 and the heated air to support combustion is admitted from the air uptake 6 through downwardly inclined ports 7 arranged above the gas ports 5. 8 indicates the usual hearth containing the metal bath 9 to be heated, and 10 indicates the top wall or roof of the furnace. In operation the fuel gases and air supply are admitted through their respective ports at one end of the furnace, and in the process of combustion pass over the metal bath and downwardly through the corresponding ports at the opposite end and downwardly through the usual checker work to the chimney; the operation being reversed at intervals in the manner well known.

In accordance with my present invention I provide additional ports 11, 11 at each end of the furnace communicating with the combustion chamber immediately beneath the furnace top and connect the upper ports 11 by means of a connecting or direct return flue 12 extending lengthwise of the furnace and communicating with the ports 11, thereby providing a passage for the returned products of combustion from the ports 11 at the outlet end of the furnace to be reintroduced through the ports 11 at the other end of the furnace into the combustion chamber immediately beneath the furnace top. The circulation of the returned products of combustion or spent gas through the return passage 12 to be reintroduced within the combustion chamber, is effected and maintained by the draft through the furnace, whereby there is created a cycle or current of spent gas across the upper region of the combustion chamber.

In the preferred embodiment of my invention I provide the return ports 11 in the outer or beveled portions of the end wall upon the opposite sides of the air inlet 7, and correspondingly provide return flues 12 extending longitudinally at each side of the furnace as indicated. This arrangement is desirable from a constructional standpoint and by forming the inlet ports as indicated the returned gases are introduced from the opposite sides of the furnace immediately beneath the furnace top so as to converge above the air column entering the chamber. A balanced arrangement is thus provided overcoming any tendency to establish a circulation to one side only of the chamber.

The products of combustion thus reintroduced will occupy the uppermost level of the combustion chamber by reason of its highly heated condition and being lighter than the air volume introduced thereunder from which it will result that the protective current of spent gas will as it enters the chamber, give off heat to the air volume better to promote combustion, and thereafter by its displacement and relatively higher heat will confine the combustion of the fuel gases to a lower level and in closer proximity to the metal to be heated, and as it passes across the combustion chamber will reabsorb heat and protect the furnace top to a large degree. By so confining the combustion to a lower level and closer to the metal bath, a much higher heating efficiency is obtained with proportionate economy in operation and furthermore by the protection afforded to the furnace top generation of higher heats is permitted than that now commonly practised.

Figure 2:
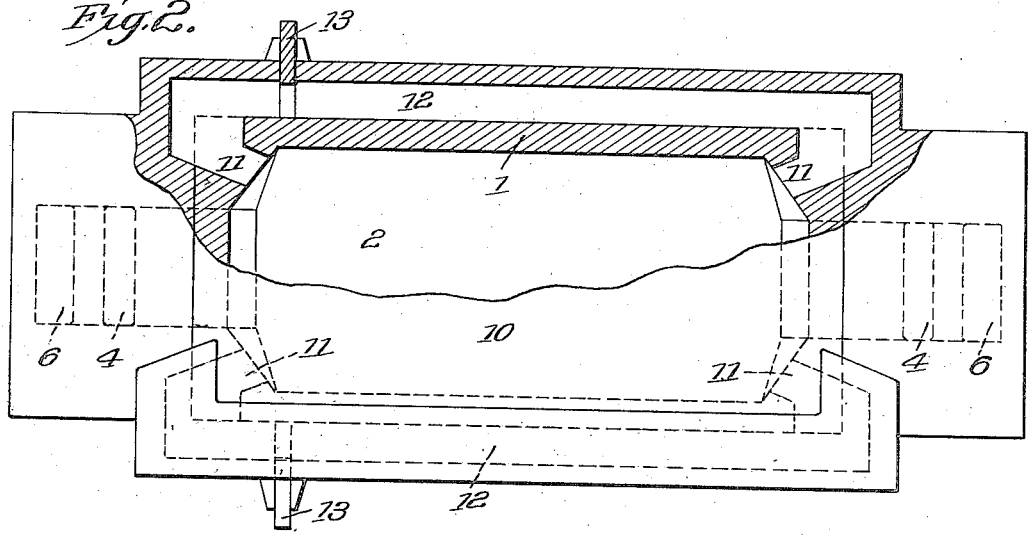
Fig. 2 is a plan view with portions broken away better to illustrate certain features thereof.
Figure 3:
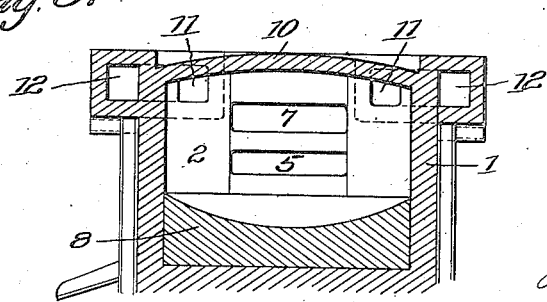
Fig. 3 is a vertical cross sectional view of the embodiment of the preceding figures.

As illustrated best in Fig. 2 the return flues 12 for the spent gases are provided with suitable valves 13 positioned within the flues or passages at any suitable location and adjustable to regulate and control the volume of spent gas readmitted to the combustion chamber.

By the provision of the superimposed volume of highly heated gases in the manner described the tendency of the combustion to rise is deferred until a relatively higher heat is attained than in the ordinary furnace from which it follows that a more progressed state of combustion is attained in the lower level of the chamber and the propagation of flame longitudinally of and at the lower level of the furnace is obtained to a greater degree. The heated gases so returned are regulated in volume proportionate to the usual excess air supply so as not to retard the combustion to an appreciable or objectionable degree.

While I have described a desirable embodiment of the features of my invention, it will be understood that many variations may be made in the construction and arrangement to obtain the advantages thereof, and without departing from the scope of the invention. It is therefore understood that all matter herein shall be interpreted as an illustrative and not in a limiting sense.

Having described my invention, I claim:

1. A furnace of the character described provided with a combustion chamber, means for introducing the combustible elements within the chamber to travel therethrough and means to introduce a volume of spent gases within the upper level of the chamber and in the direction of travel of the combustible elements to be impelled therewith across the chamber area, substantially as described.

2. A metallurgical furnace of the character described provided with a combustion chamber, means for introducing and conducting the combustible elements through the chamber and means to introduce a current of spent gases in a heated state above and in the direction of travel of the combustible elements and immediately beneath the furnace top, substantially as described.

3. An open hearth metallurgical furnace formed with a combustion chamber, means for introducing the elements of combustion into said chamber at one end thereof and conducting the products of combustion from said chamber at the opposite end thereof and provided with a return passage for heated products communicating with the combustion chamber immediately below the furnace top, substantially as described.

4. An open hearth metallurgical furnace construction provided with a combustion chamber, a hearth within the chamber, fuel gas inlet ports opening into the chamber at the lower portion thereof, air inlet ports opening into the chamber above the fuel gas ports and return ports commuicating with the combustion chamber at its upper level and a flue connecting the return ports to reintroduce heated products of combustion in the upper level of the combustion chamber, substantially as described.

5. An open hearth metallurgical furnace construction provided with a combustion chamber, a hearth within the chamber, fuel gas inlet ports opening into the chamber at the lower portion thereof, air inlet ports opening into the chamber above the fuel gas ports and return ports communicating with the combustion chamber immediately beneath the furnace top and a flue connecting the return ports to reintroduce heated products of combustion in the upper level of the combustion chamber, and a valve arranged within the return flue to control the volume of returned gases, substantially as described.

6. An open hearth metallurgical furnace formed with a combustion chamber, means for introducing the elements of combustion into said chamber at one end thereof and conducting the products of combustion from said chamber at the opposite end thereof and provided with a return passage for heated products communicating with the combustion chamber immediately below the furnace top, and said return passage being carried to one side of the combustion chamber, substantially as described.

7. A regenerative open hearth furnace construction provided with a combustion chamber, a hearth within the chamber, downwardly inclined fuel gas inlet ports opening into the chamber at the opposite ends thereof and at the lower level of the chamber, similarly arranged air inlet ports positioned above the fuel gas ports and return ports in the end wall opening into the combustion chamber from opposite sides and directed inwardly parallel to the furnace top and laterally extended flues connecting the return ports, substantially as described.

8. A regenerative open hearth furnace construction provided with a combustion chamber, a hearth within the chamber downwardly inclined fuel gas inlet ports opening into the chamber at the opposite ends thereof and at the lower level of the chamber, similarly arranged air inlet ports positioned above the fuel gas ports and return ports opening into the combustion chamber from opposite sides and directed inwardly parallel to the furnace top, laterally extended flues connecting the return ports and a regulating valve arranged to control the volume of returned products passed through the return flue, substantially as described.

9. An open hearth metallurgical furnace formed with a combustion chamber, means for introducing the elements of combustion into said chamber at one end thereof and conducting the products of combustion from said chamber at the opposite end thereof and provided with return flues for heated products communicating with the combustion chamber immediately below the furnace top, and said return passages being carried to opposite sides of the combustion chamber, substantially as described.

10. A metallurgical furnace of the character described provided with a combustion chamber, inlet and exhaust ports for the combustible elements at the opposite ends of the chamber and provided with return passages for reintroducing heated products within the chamber having inlet ports opening into the chamber immediately beneath the furnace top and directed toward the exhaust port, substantially as described.

11. An open hearth furnace of the character described provided with a combustion chamber, inlet and exhaust ports for the combustible elements at the opposite ends of the chamber and provided with means for reintroducing heated waste gases within the chamber and at the upper level thereof said means being operative to reintroduce waste gases in the general direction of travel of the gases through the chamber and to converge with the combustible gases as they enter the chamber, substantially as described.

12. The herein described method of promoting more efficient combustion of the fuel gases in open hearth furnaces which consists in reintroducing heated products of combustion into the furnace chamber so as to be impelled to move in a closed cycle or eddy-current by the velocity of the gases passing through the chamber.

In testimony whereof I have signed my name to this specification.

JOHN ROSCOE MILLWARD.